United States Patent [19]

Guilloteau

[11] Patent Number: 4,836,581

[45] Date of Patent: Jun. 6, 1989

[54] DEVICE FOR MAKING A SEALED CONNECTION

[75] Inventor: René Guilloteau, Verrieres le Buisson, France

[73] Assignee: Societe Generale Pour les Techniques, Nouvelles, France

[21] Appl. No.: 81,511

[22] Filed: Aug. 5, 1987

[30] Foreign Application Priority Data

Aug. 11, 1986 [FR] France .................. 86 11593

[51] Int. Cl.$^4$ ............................................. F16L 27/06
[52] U.S. Cl. ..................................... 285/31; 285/165; 285/332.1; 285/332.3; 285/917
[58] Field of Search .................. 285/31, 32, 163, 164, 285/165, 166, 332.1, 332.2, 332.3, 332, 368, 412, 348, 328, 917

[56] References Cited

U.S. PATENT DOCUMENTS

| 3,233,921 | 2/1966 | Holmgren et al. | 285/332.1 |
| 3,332,709 | 7/1967 | Kowalski | 285/164 |
| 3,720,428 | 3/1973 | Zastawny | 285/368 |
| 3,986,730 | 10/1976 | Martelli et al. | 285/348 |
| 4,195,865 | 4/1980 | Martin | 285/263 |
| 4,371,198 | 2/1983 | Martin | 285/263 |
| 4,427,222 | 1/1984 | Abbes et al. | 285/368 |
| 4,640,530 | 2/1987 | Abbes et al. | 285/368 |

FOREIGN PATENT DOCUMENTS

| 1253963 | 1/1961 | France . | |
| 1507450 | 12/1967 | France . | |
| 2370222 | 6/1978 | France . | |
| 993648 | 6/1965 | United Kingdom | 285/332 |
| 1020699 | 2/1966 | United Kingdom | 285/165 |
| 1265797 | 3/1972 | United Kingdom | 285/165 |

Primary Examiner—Randolph A. Reese
Assistant Examiner—Anthony Knight
Attorney, Agent, or Firm—Dickstein, Shapiro & Morin

[57] ABSTRACT

The invention relates to a device for making a sealed connection of adaptable length suitable for interconnecting two pipes whose axes are not necessarily in alignment. The device in accordance with the invention comprises a flange placed on each pipe with each flange being provided with a spherical bearing surface on its end face and with a spherical bearing surface on its opposite face. A central tube has a thrust member mounted at each end thereof, each thrust member including a void for receiving at least one spacer. The tube is also provided with a flange which serves to bring the spacer against a sealing ring pressed against the end face of the flange by being clamped to a backing flange. The backing flange has a spherical surface that cooperates with the spherical surface of the opposite face of the pipe-mounted flange. At least one of said thrust members receives at least two spacers separated by sealing ring. The invention also provides a clamping method. A connection in accordance with the invention is particularly applicable in the nuclear industry.

4 Claims, 7 Drawing Sheets

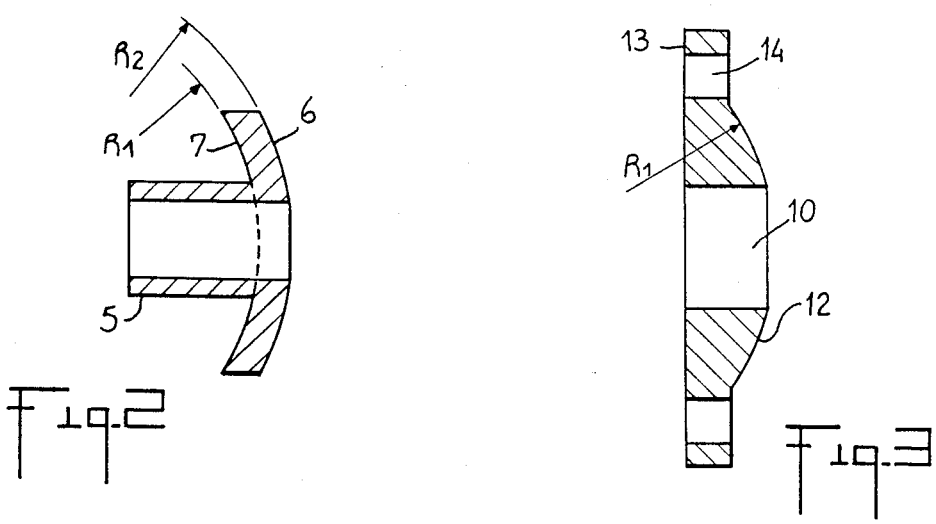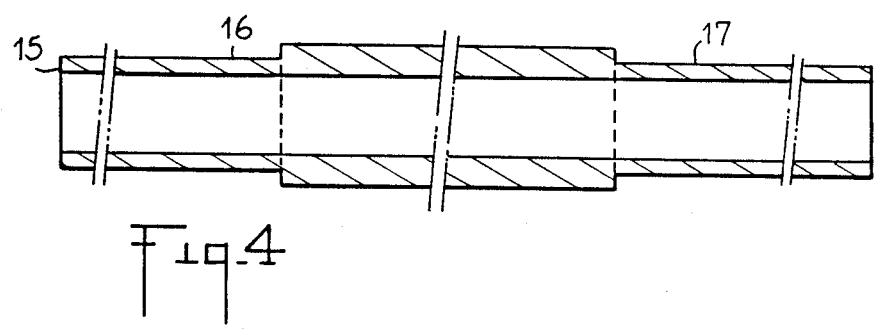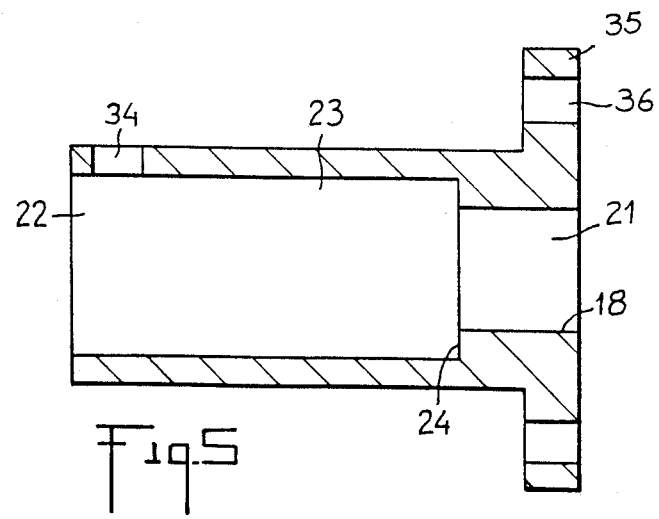

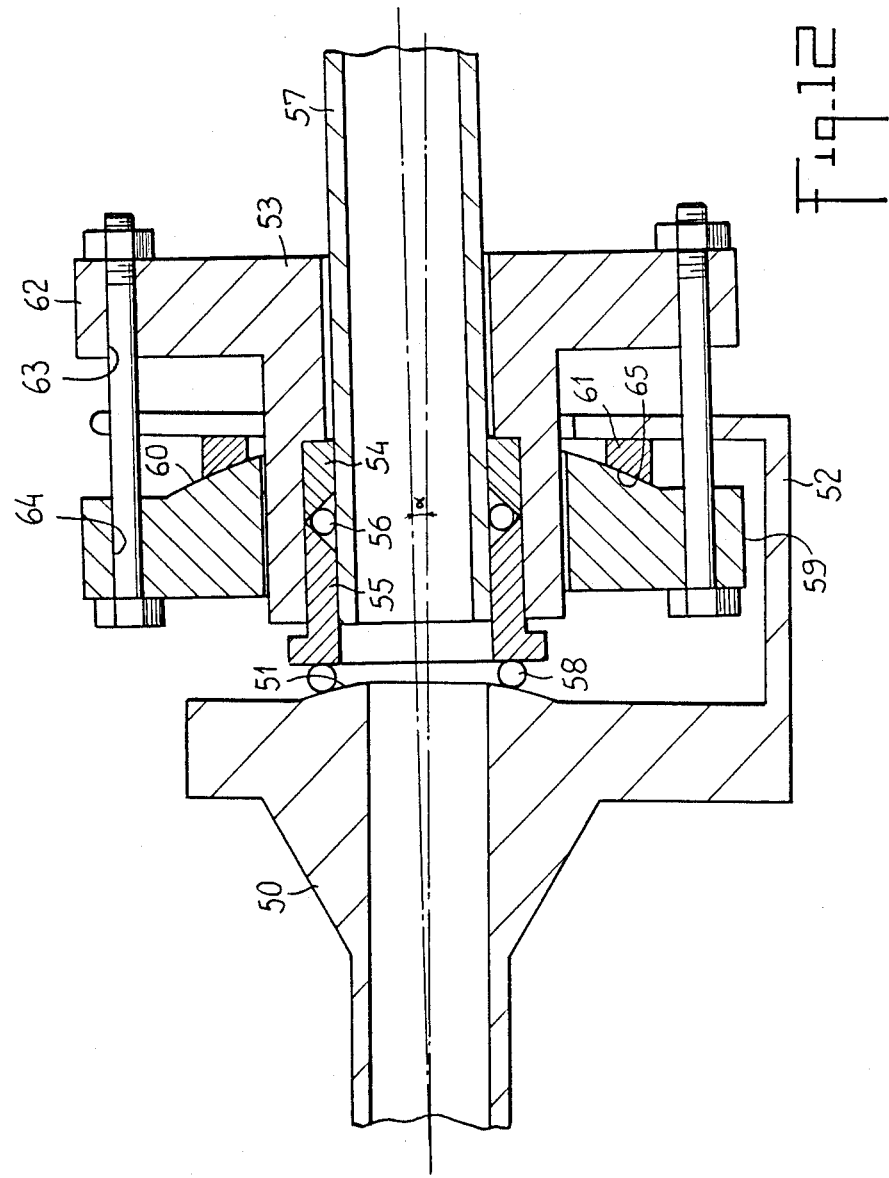

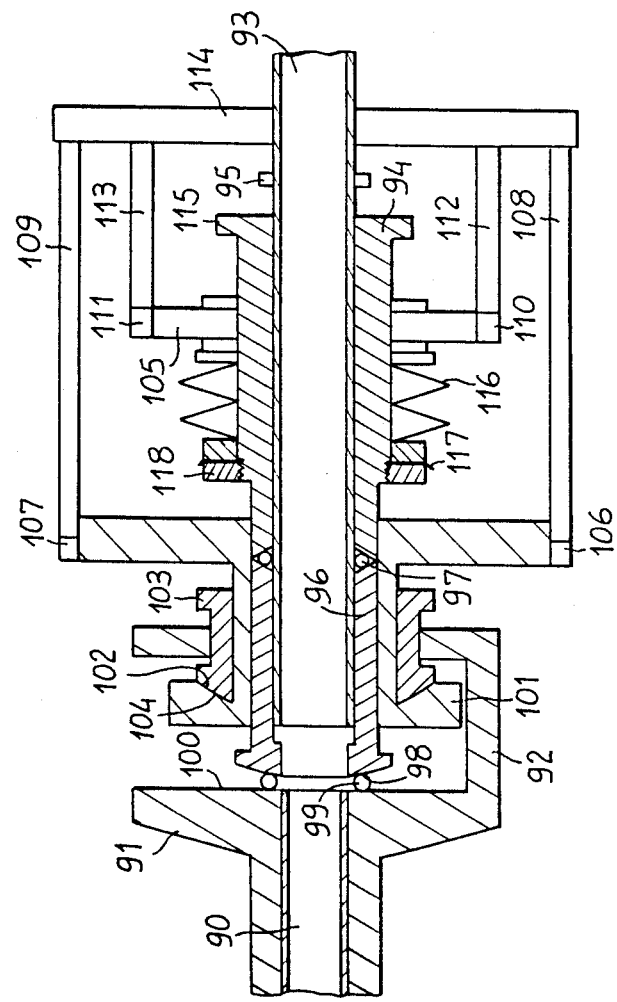

DEVICE FOR MAKING A SEALED CONNECTION

A DEVICE FOR MAKING A SEALED CONNECTION

The invention relates to a device for making a sealed connection which is adaptable in length and in orientation.

BACKGROUND OF THE INVENTION

The problem solved by the invention is to connect in sealed manner two pipes whose axes are not aligned (they may be offset laterally or angularly).

One existing solution consists in using flexible connections enabling small defects in alignment to be accommodated. However, when the defects of alignment are large, or when operating security requirements prevent the use of flexible or of corrugated tubes, it is necessary to provide a rigid connection between pipes which are offset, while nevertheless maintaining sealing.

Since the pipes are at a distance apart which is not exactly predetermined, it is necessary for the rigid connection device to be adaptable in length.

It is also desirable for the device to be capable of being assembled and disassembled easily, and in particular using remote handling equipment or a robot. In some applications in the nuclear industry, remote control is essential, for example when connecting pipes in cells where human intervention is not allowed because of the danger of contamination and/or irradiation.

SUMMARY OF THE INVENTION

According to the present invention, the device for making a sealed connection includes the improvements whereby:

the end of each of the pipes is provided with an end flange having an end face and an opposite face including a spherical bearing surface; and the device is constituted by:

a central tube which is slightly shorter than the distance between the facing end faces of the two end flanges and whose diameter is substantially equal to the diameter of the pipe to be connected;

two thrust members telescoped over said central tube and each facing one of the ends thereof, each thrust member being constituted by a flange for clamping purposes and by a tube including a void whose opening is directed towards the end of said central tube. The void is intended to receive at least one spacer. The thrust member crushes a sealing ring between the outside surface of the free end of said spacer and the end face of said pipe-mounted flange by clamping the flange of the thrust member to a backing flange disposed against said opposite face of the pipe-mounted flange. The end face has a spherical surface which cooperates with the spherical surface of said opposite face, at least one of said surfaces or faces having a spherical bearing surface.

The four spherical bearing surfaces, i.e. the bearing surface of the end face of the pipe-mounted flange; the outer surface of the free end of the spacer; the spherical bearing surface of the backing flange; and the spherical bearing surface of the opposite face of the pipe-mounted flange, are disposed in such a manner as to have the same spherical center when the device is clamped.

The spacer of at least one of said thrust members is made up of two spacers one of which comes into abutment against the end of the void in said thrust member and the other of which projects beyond the end of said central tube. The facing ends of the two spacers having frustoconically-shaped surfaces and face towards said central tube. A sealing ring is disposed between the facing ends of these two spacers in such a manner that said sealing ring is clamped between said ends and against the central tube when said thrust member is clamped to the corresponding backing flange.

In a device in accordance with the invention, the connection is sealed by:

the sealing ring situated between the end face of the pipe-mounted flange and the outside surface of the free end of the spacer which, when clamped, allows fluid to pass without leaking from the pipe into the central tube (the normal operating condition);

in order to provide adequate sealing when the interconnected pipes are offset, it is necessary in accordance with the invention for one of the surfaces in contact with said sealing ring to have a spherical bearing surface; and said spherical bearing surface may thus be provided either on the end face of the pipe-mounted flange (in which case its center is situated on the pipe side thereof), or else on the free end surface of the spacer (in which case its center is situated on the central tube side thereof).

If leakage should occur, for example due to fatigue in said sealing ring, a drip pan assembly may be provided on the thrust member or on the pipe-mounted flange so as to be positioned, after clamping, beneath said sealing ring for the purpose of recovering leaks.

It is preferable for the sealing rings used to be made of metal mounted on thin metal sheet.

The pipes and the central tube do not touch one another, and as a result the fluid comes into contact in turn with the pipe, the end face of the flange, the sealing ring, the spacer, and then with the central tube.

The clearance between the central tube and the spacer is the minimum compatible to allow for spacer sliding; fluid may infiltrate into this clearance.

Consequently, it is necessary to provide a second sealing means.

When two spacers are provided in the void, the second sealing means is constituted by a sealing ring placed between the two spacers and pressed against the central tube.

In order to improve the contact with said sealing ring, the surfaces of the spacers against which the sealing ring is pressed are frustoconical in shape with their surfaces oriented towards said tube.

It is preferable to use metal sealing rings.

It is advantageous for all of the sealing rings in the connection to require the same clamping force in order to guarantee sealing.

The importance of the sealing ring situated between the two spacers should be underlined, it has the functions of enabling free sliding of the spacers relative to the central tube while the sealing ring is not clamped;

ensuring final sealing of the connection when it is clamped; and enabling the materials to be adapted to one another.

Since the spacer can project beyond the end of the central tube, it is preferably made of the same material as the central tube or a material which is compatible with the fluid into which it will come into contact when the connection is established. It is not necessary, and it may even be unsuitable to use such a material for the spacer which comes into contact with the thrust member. The constitution of this means of the invention (a sealing ring between two spacers) makes it possible to select different materials for each of the spacers, with each material being adapted to its particular application.

When only one spacer is inserted in the void in the thrust member, sealing is provided between the tube and the spacer by means of a fillet weld, for example, or else by any other means capable of providing sealing such as a sealing ring.

The pipe connection is made as follows. There is a spherical bearing surface on the end face of the pipe-mounted flange or on the external surface of the free end of the spacer over which the sealing ring may move while remaining in contact with the flange and the spacer. Preferably, said spherical bearing surface is designed to have a large radius.

There is also a spherical surface of the backing flange disposed against the spherical surface of the opposite face of the pipe-mounted flange and cooperating therewith. During clamping these surfaces constitute a knuckle joint relative to each other so that the axis of symmetry of the spherical surface of the backing flange is brought into alignment with the axis of the central tube, and the centers of the spherical surface of the backing flange and of the spherical surface of the end surface of the pipe-mounted tube then coincide.

Preferably, the knuckle joint spherical surfaces of the backing flange and of the opposite face of the pipe-mounted flange have the same radius. On being clamped, they also have the same center which is also the center of the spherical bearing surface of the end face of the pipe-mounted flange, or else of the end surface of the free end of the spacer.

In order to accommodate small alignment defects, the radius of the spherical surface of the opposite face of the pipe-mounted flange may be very large, and the opposite face may even be flat.

In order to facilitate the knuckle joint effect, at least one of the parts supporting a spherical surface must not be rigidly fixed.

Thus, since the flange is fixed to the pipe, the backing flange is placed on the pipe (or on the flange) with clearance such that on clamping it takes up an angle relative to the axis of the pipe so as to align the axis of symmetry of the spherical surface with the axis of the central tube. The backing flange may also be placed on the tube of the thrust member and have clearance relative thereto.

Various shapes may be used for the void in the backing flange such as a bore or a slot.

The length of a connection is determined at one of the ends of the tube, after the other end has been fixed.

When the flange of the thrust member on the nonadjustable end of the tube is clamped to the facing backing flange, the spacer slides along the central tube beyond the end of said central tube in order to clamp the sealing ring against the flange. The central tube is thus extended by said spacer and the fluid will come into contact therewith.

In a practical embodiment of the invention, both ends of the tube are provided with a pair of spacers each separated by a sealing ring.

However, the initially fixed end of the central tube does not need to have a spacer capable of sliding relative to said tube. Consequently it may be designed to have a spacer which is welded to the tube about a shoulder so as to occupy the void in the thrust member on being clamped. In this case, determination of the length of the connection necessarily takes place at the thrust member which has two spacers separated by a sealing ring and which is located at the adjustable end of the central tube.

Various methods may be used for clamping, for example clamping may simply be provided using torque wrenches, however this does not give the force actually applied on the sealing rings since friction on threads and washers, etc. cannot be calculated.

The invention thus also provides a clamp means designed to apply a predetermined clamping force on the sealing rings used.

The value of the clamping force is given by the compression force to be applied on the sealing ring in order to guarantee sealing.

If a plurality of sealing rings have different compression forces, sealing is ensured only by taking the highest value for the clamping force.

It is therefore preferable to use sealing rings which require the same compression force, and better still to use identical sealing rings.

Preferably, the clamping means serving to apply a predetermined clamping force on the sealing rings employes a system of prestressed bolts. The clamping system may be constituted by HYDROCAM equipment from SKF Corporation, for example. The system of prestressed bolts consists in interconnecting the items to be clamped (in this case the backing flange and the flange on the thrust member) by bolts which pass through holes provided for this purpose. One end of each bolt is pressed against one of the items to be clamped and the other end is provided with a nut while a traction force is exerted thereon to lengthen the bolt. The nut is then tightened while the traction force is maintained. The bolt is then released and returns to its initial length.

The known clamping force F obtained in this way (which depends on the elongation, on the Young's modulus, and on the geometrical dimensions of the bolt) is fully transmitted by the thrust member and the spacer(s) and serves solely to compress the sealing rings such that the compression force exerted on the sealing rings is equal to the known clamping force.

Because the invention slides without friction and the prestressed bolt ensure a quantifiable compression force, the sealing rings can be used under optimum conditions, thereby guaranteeing sealing.

Another method of clamping with a known force is constituted by a toggle system.

The toggle system is constituted by first and second articulated links. The first link is hinged to a fixed reaction member integral with the backing flange. The second link is hinged to the flange on the moving thrust member which comes into contract against an abutment placed on the central tube. A lever is placed on the common hinge axis between the first and second links in order to actuate the system.

Resilient means are provided between the reaction member and the flange on the thrust member in order to enable clamping, said resilient means being constituted by so called "Belleville" washers or by springs, and are optionally accompanied by means for adjusting the prestress of said resilient means.

BRIEF DESCRIPTION OF THE DRAWINGS

Embodiments of the invention are described by way of example, with reference to the accompanying drawings, in which:

FIG. 2 is a cross-sectional view of a detail of the flange used in the FIG. 1 device;

FIG. 3 is a cross-sectional view of the backing flange cooperating with the FIG. 1 flange;

FIG. 4 is a longitudinal cross-sectional view through the central tube of FIG. 1;

FIG. 5 is a cross-sectional view of the thrust member of FIG. 1;

FIG. 12 is a cross-sectional view of an alternate embodiment of FIG. 1 including a core applied against the opposite face of the tube-mounted flange;

FIG. 16 is a cross-sectional view of alternate embodiment of FIG. 1 employing clamping by means of a toggle system.

DETAILED DESCRIPTION OF THE PREFERRED EMBODIMENT

Figure 1:
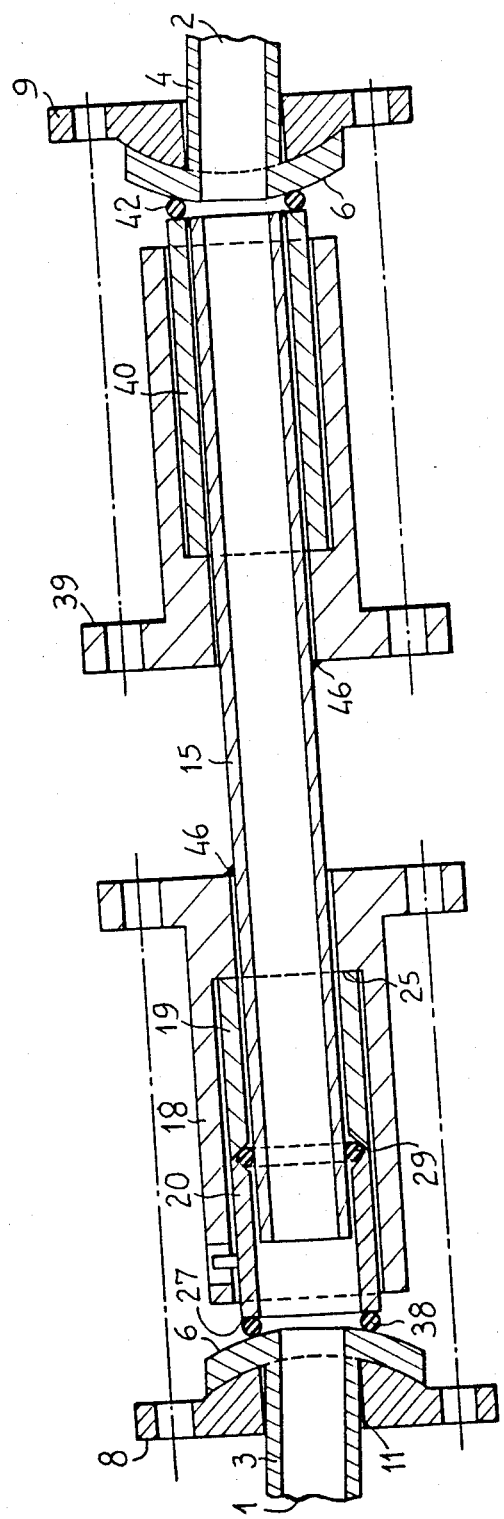
FIG. 1 is a cross-sectional view of a sealed connection in accordance with the invention.

The two pipes to be connected 1 and 2 are offset, as shown in FIG. 1.

Flanges 3 and 4 are welded to the ends of said pipes.

Each flange comprises (FIG. 2) a cylindrical sleeve 5 whose inside diameter is substantially equal to the outside diameter of the pipe, and suitable for fitting over said pipe. The sleeve is terminated at its pipe end by a flange whose end face constitutes a spherical bearing surface 6 which is situated in front of the end of the pipe. This flange-terminating spherical bearing surface 6 has a center O situated according to FIG. 2 on the axis of the pipe, and a radius R2 which is large in order to reduce the curvature. The drawing exaggerates the curvature in order to facilitate understanding the device and its operation. In another disposition, the center could be situated on an imaginary line projecting the axis of the pipe outwardly from the pipe.

In the embodiment shown in FIGS. 1 and 2, the opposite faces of the flanges 3 and 4 are also spherical surfaces 7 centered on O and of radius R1 which is less than R2.

The flanges are preferably made of the same material as the pipes since they come into contact with the fluid.

Each pipe end is also fitted with a backing flange 8 or 9. FIG. 3 shows a backing flange which is slid over the sleeve 5 of the flange prior to said flange being fixed to the pipe, and which has a bore 10 whose diameter is greater than the outside diameter of the sleeve 5 over which the backing flange slides. Clearance 11 is left between the sleeve 5 and the backing flange, and said clearance may be about ten millimeters.

The backing flange also has a spherical surface 12 facing the spherical bearing surface 7 of the associated flange, and these two bearing surfaces have the same radius R1.

Finally, another portion 13 is disk-shaped and has holes 14 therethrough, enabling the backing flange to be connected to a facing thrust member.

A tube 15 constitutes the central tube of the connection and is cut to a length which is approximately equal to the distance between the two spherical bearing surfaces 6 of the flanges 3 and 4. It is reasonable to allow for an error of up to 2 cm.

The tube 15 is made of material which is compatible with the fluid, and preferably of the same material as the pipes.

As can be seen in FIG. 4, the tube 15 is rectified at each of its ends over a length which is not less than the length of the thrust member in order to facilitate sliding the thrust member, and above all in order to provide good sealing over the rectified surfaces 16 and 17.

Figure 9:
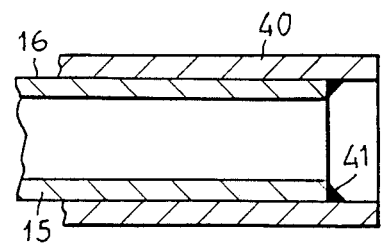
FIG. 9 is a cross-sectional view of a sealing weld between the tube and a spacer of FIG. 1.

Each end of the tube 15 is provided, as can be seen in FIG. 1, with a thrust member 18 or 39 shown in greater detail in FIG. 5. The left-hand end in FIG. 1 also includes two spacers 19 and 20 which are shown in detail in FIG. 6. The right-hand end has only one spacer, shown in FIG. 9.

Each thrust member 18 or 39 comprises a tube having a bore 21 whose diameter is just greater than the diameter of the rectified tube 15 so that the inside surface is capable of sliding without friction over the rectified surface, e.g. 16, of the central tube 15.

A void 23 is created in said bore of each thrust member by a bore 22 of greater diameter than the bore 21.

Each of the thrust members 18 and 39 is disposed on the tube 15 in such a manner as to have the opening of the void facing towards the corresponding end of the tube 15.

Spacers 19 and 20 or 40 are slid along the voids 23 of the thrust members up to the ends 24 thereof, as can be seen in FIG. 1.

Each of said spacers comprises a cylinder whose inside diameter is just greater than the diameter of the rectified tube and whose outside diameter is just less than the diameter of the bore 22 so as to be able to slide without friction while leaving minimum clearance. As shown on the left-hand end of the tube in FIG. 1, the spacers 19 and 20 are separated by a sealing ring 29.

Figure 6:
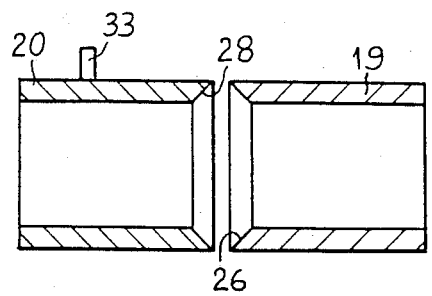
FIG. 6 is a cross-sectional view of the frustoconical ends of the FIG. 1 spacers.

The spacer 19 presses against the end 24 of the void in the thrust member via a surface 25, and its opposite end has a frustoconical surface 26 which faces the tube 15 (see FIG. 6).

The other spacer 20 has a free end 27 facing the spherical bearing surface on the end face of the flange, while its opposite end 28 is likewise frustoconical in shape with its face facing the tube 15.

A sealing ring 29 is disposed between the ends 26 and 28 and is also in contact with the rectified surface 16 of the tube 15.

The spacer 20 has a peg 33 which is received in a slot 34 extending through the tube of the thrust member 18 perpendicularly to its axis. This peg serves to hold the spacers 19 and 20 inside the thrust member 18 during assembly. The size of said slot is such as to allow the spacer 20 to slide freely in order to match lengths.

The spacers are made of materials which are preferably selected as follows: the material of the spacer 19 is the same as the material of the thrust member 18; and the material of the spacer 20 is identical to that of the tube 15.

The thrust member 18 also includes a flange 35 having holes 36 for receiving clamping means 37. Said means connect the thrust member 18 or 39 to the corresponding backing flange 8 or 9.

Figure 7:
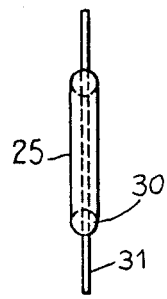
FIGS. 7 and 8 show a metal sealing ring mounted on a supporting metal sheet, FIG. 7 being a cross-sectional view and FIG. 8 being a front view.
Figure 8:
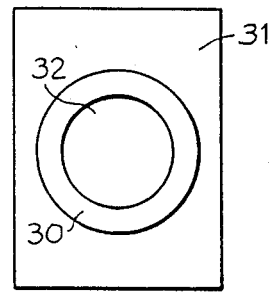

A sealing ring 38 is disposed between the spherical bearing surface 6 of the flange 8 and the end 27 of the spacer 20. The sealing ring used is preferably made of metal mounted on thin metal sheet. It is shown in FIGS. 7 and 8. The sealing ring 38 comprises a ring 30 mounted thin metal sheet 31 and having a central bore 32.

Preferably, the sealing rings 29 and 38 require the same clamping forces in order to guarantee sealing.

Simplified connecting means are provided at the right-hand end in FIG. 1. These means compile a thrust member 39 identical to the thrust member 18 and a void which receives a single spacer 40 bearing against the end 24 of the void in the thrust member 39.

Sealing is provided by a weld 41 (FIG. 9) to the rectified end 16 of the tube 15 and by a sealing ring 42 placed between the spacer 40 and the spherical bearing surface 6 of the flange.

Figure 10:
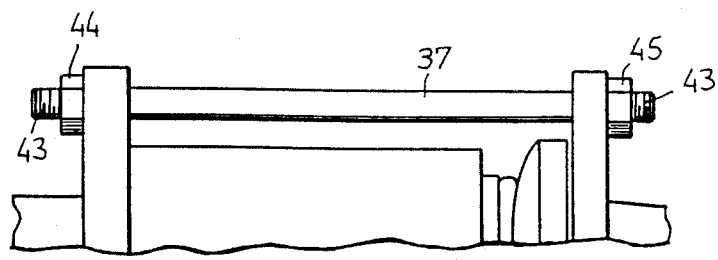
FIG. 10 is a front view of clamping of the thrust member and backing flange of FIG. 1 by the system of prestressed bolts.

The clamping means 37 (FIG. 10) interconnecting each thrust member with the corresponding backing flange are constituted by bolts 43 running through the holes 36 in the flanges 35 of the thrust members and through the holes 14 in the backing flanges, together with nuts 44 and 45 screwed onto each free end of each bolt.

The connection is put into place as follows.

To begin with, the backing flanges 8 and 9 are mounted on each pipe and then the flanges 3 and 4 are welded to the pipes.

A tube is then cut to the desired length (slightly less than the distance between the flanges) and is rectified at its ends over a length which is not less than the length of the thrust members.

A thrust member is then threaded over one end of the tube and is optionally held in place by a small spot weld 46 between the thrust member and said tube for facilitating installation.

The sole spacer 40 is slid into its void but in such a manner as to ensure that it projects beyond the end of the tube; it is then welded into place on the end of said tube (spot weld 41), thereby building up the right-hand end of the tube as shown in FIG. 1. The sealing ring 42 is put into place and the assembly is positioned so that the spacer 40 comes against the sealing ring 42.

The bolts 43 with nuts 44 at one end thereof are passed through the aligned holes in the backing flange and the thrust member. The spherical surfaces of the backing flange and the rear face of the flange come into contact. By virtue of its clearance, the backing flange takes up a position such that the axis of symmetry of its spherical surface is in alignment with the axis of symmetry of the central tube. Its spherical surface moves simultaneously against the facing spherical face of the flange. A traction force is exerted on the opposite free ends of the bolts, thereby stretching each bolt by n mm (this may be done, for example, using the HYDROCAM device sold by SKF Equipment). The nuts 45 are then screwed on the bolts while the traction force is maintained and the bolts are then released so that they tend to return to their initial lengths. The parts are thus clamped together, and the clamping force compresses the sealing ring.

When using metal sealing rings such as CEFILAC sealing rings, sealing is guaranteed for a compression force of 150 kg per linear cm of the sealing ring (i.e. the traction force should not be less than that value).

With the right-hand end of the tube fixed in this way, the opposite end of the tube is prepared. The thrust member 18 is slid along the tube 15 and is then fixed thereto by a light spot weld 46. The first spacer 19 is slid to the end of the void in the thrust member and the sealing ring together with the other spacer 20 are then slid into place.

The sealing ring 38 is put into place and the thrust member 18 is pushed so as to slide the spacers 19 and 20 until the spacer 20 presses the sealing ring 38 against the spherical bearing surface 6 of the end face of the flange 3. The spacer 20 thus extends the central tube up to the flange through which the fluid flows, with sealing being provided by the sealing ring. The thrust member is then clamped to the backing flange in the same manner as before.

Figure 13:
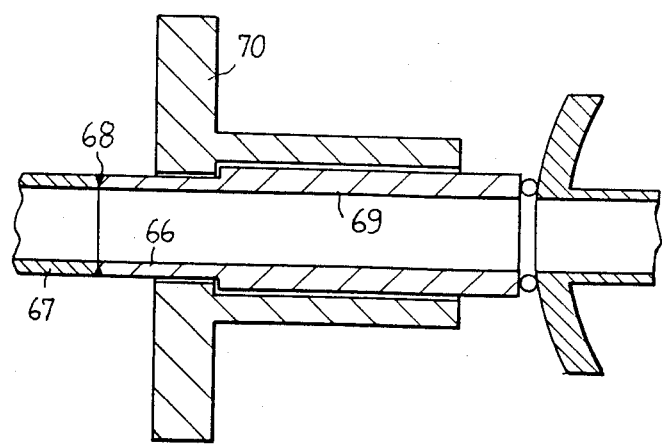
FIG. 13 is a cross-sectional view of an alternate embodiment of FIG. 1 employing a spacer made from an end fitting.
Figure 11:
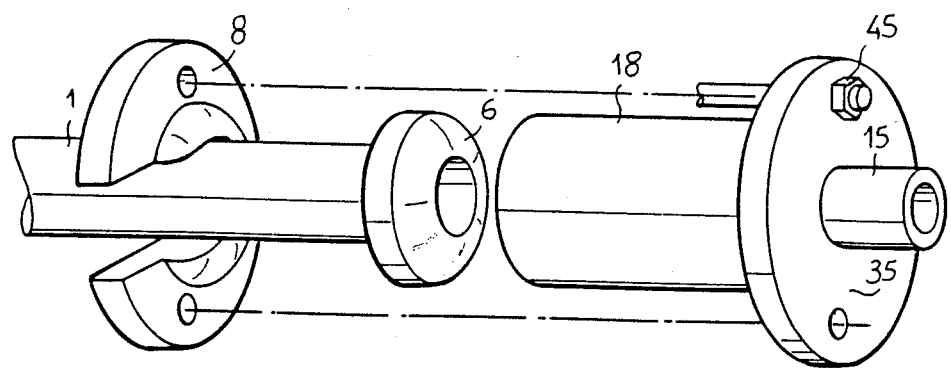
FIG. 11 is a front view of an alternate embodiment of FIG. 1 employing a split backing flange.

FIGS. 11, 12, and 13 show variants of the device in accordance with the invention.

FIG. 11 shows another type of backing flange. It is split and is not put into place until clamping occurs.

FIG. 12 shows another embodiment of the invention with length adapting means being added to a single end of the connection.

In this disposition, the flange includes a sleeve 50 fixed to the pipe and a spherical bearing surface 51 of radius R2 centered on the axis of the pipe. It also includes a trough 52 which is upwardly open and which receives the connection.

As in the first described embodiment it includes a thrust member 53 having a void which receives two spacers 54 and 55 including frustoconical surfaces facing the tube 57 and pressed against a sealing ring 56 which also presses against the central tube 57.

The spacer 55 compresses a sealing ring 58 against the spherical bearing surface 51 of the end face of the flange in order to provide sealing.

Clamping takes place between the flange 62 on the thrust member 53 and a backing flange 59 mounted on the thrust member itself. This backing flange is situated close to the end of the tube and leaves clearance relative to the tube of said thrust member. The backing flange 59 has a spherical surface 60 of radius R1 with the same convexity as the spherical bearing surface 51.

A core 61 is placed in the trough facing the spherical bearing surface 51 and having a spherical surface 65 of radius R1 with the same convexity as the other bearing and spherical surfaces.

The spherical surface 65 thus comprises the spherical surface of the face facing the flange.

Bolts are passed through the holes 64 and 63 respectively through the backing flange and the flange of the thrust member in order to provide clamping by means of a system of prestressed bolts.

During clamping, the same radius spherical surfaces of the core and of the backing flange press against each other so that their centers coincide with the center O of the spherical bearing surface 51 of the flange.

The length is matched and sealing is provided in the same manner as in the first-described embodiment.

FIG. 13 shows another preferred embodiment for the right-hand end of the tube the end which is fixed first in which an end fitting 66 is fixed onto the central tube 67 by means of a weld 68.

This end fitting has the same diameter as the central tube and has a shoulder 69 constituting the spacer and received in the void 23 of the thrust member during clamping.

Naturally, in this case, the tube is cut to be slightly shorter than the distance between the flanges less the length of the add-on end piece.

Installation consists in sliding the thrust member 70 over the tube 67, then in welding on the end fitting 66, with the subsequent operations being performed as described above.

For disassembly, the nuts are unscrewed, the bolts are withdrawn, and the parts are separated.

Figure 14:
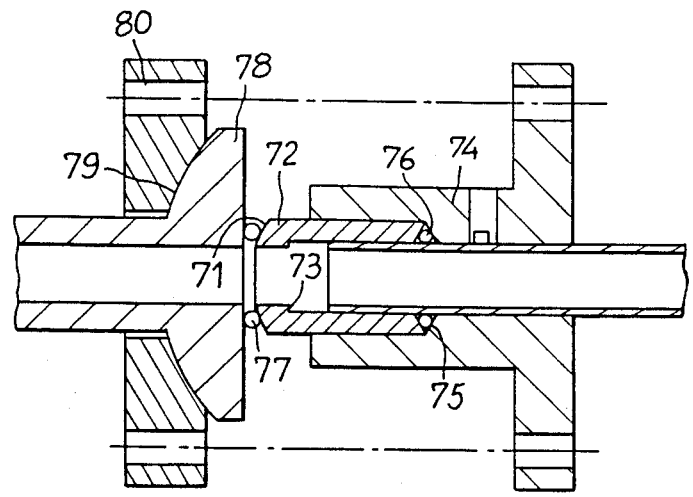
FIGS. 14 and 15 is a cross-sectional view of alternate embodiment of FIG. 1 employing variants with the centers of the spherical bearing surfaces located in the central tube.
Figure 15:
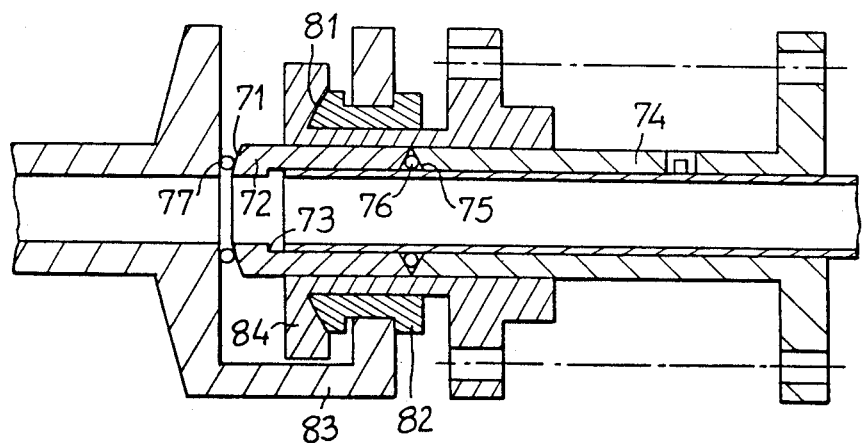

The same method of clamping is used in FIGS. 14 and 15 with FIG. 14 having a backing flange on the pipe whereas FIG. 15 has a backing flange situated on the central tube together with a trough flange.

These variants show more precisely that the sealing ring 77 placed between the flange and the central tube is in contact with a spherical bearing surface 71 situated at the free end of the spacer 72. In the preferred embodiment shown in these figures, the diameter of the free end of the spacer 72 is equal to the diameter of the pipe, with the spacer 72 including a shoulder 73.

In these figures, the thrust member 74 has a frusto-conical surface 75 at the end of its void with the sealing ring 76 bearing thereagainst. Thus, the thrust member then acts as the second spacer.

Since the spherical bearing surface in contact with the sealing ring 77 has its center on the central tube side thereof, the spherical bearing surface of the facing faces of the flange and the backing flange are disposed so that their centers are on the same side.

FIG. 14 shows the flange 78 and its bearing surface 79 placed on its opposite face which cooperates with the spherical bearing surface of the backing flange 80 placed on the pipe.

In FIG. 15, the opposite face 18 with the spherical bearing surface is constituted by a core 82 coming into abutment against the trough 83 of the flange, with said spherical bearing surface cooperating with the spherical bearing surface of the backing flange 84.

FIG. 16 shows a toggle type clamping system.

A flange 91 is fixed onto the pipe 90 and includes a trough 92. A support 94 is mounted on the central tube 93 and abuts against one or two spacers 96 and an abutment 95 which is fixed to the tube. In the diagram, only one spacer 96 is shown, with the support acting as the second spacer. It would have been equally possible to place a second spacer in the void of the support.

A sealing ring 97 is placed between the support and the spacer facing surfaces are frustoconical in shape.

The surface of the free end of the spacer has a spherical bearing surface 98 which comes into contact with the sealing ring 99 pressed against the plane surface of the end face 100 of the flange 91.

A backing flange 101 having a spherical bearing surface 102 rocks on a core 103 whose spherical bearing surface 104 constitutes the face which faces the flange. This disposition is very similar to that shown in FIG. 12.

During clamping, the core is pressed against the trough and is clamped by the backing flange.

For clamping purposes, the backing flange constitutes a fixed surface against which the thrust member or the flange 105 is clamped. Two arms 108 and 109 constituting a system of first links system are hinged to points 106 and 107 on the so-called fixed surface. Arms 112 and 113 constituting a system of second links are hinged to points 110 and 111 on the so-called moving surface of the thrust member.

The opposite ends of these arms are connected to a common shaft 114 having a lever that comes into abutment against the central tube.

In the unclamped state, the thrust member may be moved up to an abutment 115 placed on the support.

The support also has resilient means for ensuring clamping mounted between the fixed and moving surfaces. These means may be Belleville spring-type washers or other forms of spring in general, so as to provide a degree of prestress. In FIG. 16, two Belleville washers 116 are shown diagrammatically, as are means 117 for adjusting the stress.

For clamping purposes, the lever is lowered towards the central tube. As this happens, the common shaft 114 is displaced and drives the arms of the systems of first and second links. The moving thrust member 105 thus moves towards the end portion 118 of the support on which it is fixed and thereby compresses the resilient means.

Thrust is thus transmitted to the support by the portion 118, and to the sealing ring 97, to the spacer 96, and to the sealing ring 99 by the bearing surface 98.

The axes of the systems of first and second links tend to move in parallel and then to go past said equilibrium position, thereby providing locking when the lever comes into abutment against the central tube.

The above description shows that it is easy to install a connection in accordance with the present invention.

All that is required are the component parts; and a connection is assembled by engaging and sliding the parts over a tube which is cut on site to the selected length, optionally making use of one or two spot welds.

During installation on the pipes, the various parts adapt automatically to the required length when the last end is clamped.

Displacement of the sealing ring between the flange and the spacer over a spherical bearing surface and the displacement of the spherical bearing surface of the backing flange over a different spherical surface of the flange make it possible to match an offset between the pipes, and consequently make it possible to absorb displacements due to thermal expansion.

Similarly, clamping does not present any special difficulties, with the clamping method in accordance with the invention ensuring that the compression forces applied to the sealing rings are mastered.

The simple design of a device in accordance with the invention, the ease with which it can be installed and thus also the ease with which it can be dismounted are advantages which enable the device to be remotely controlled, and which thus enable it to be applied to nuclear applications.

I claim:

1. A device for making a sealed connection which is adaptable in length and in orientation between two pipes whose ends are at a distance apart by a length which is not precisely determined and whose axes need not be aligned, comprising:

the end of each of the pipes having a pipe-mounted end flange having an end face and an opposite face, each of said faces including a spherical bearing surface;

a central tube which is slightly shorter than the distance between the facing end faces of the two end flanges and whose diameter is substantially equal to the diameter of the pipe to be connected;

two thrust members telescoping over said central tube and each thrust member facing one of the ends of the tube, each thrust member including a flange for clamping purposes and a tube including a void whose opening is directed towards the end of said central tube, said void being dimensioned to receive at least one spacer, said thrust member dimensioned for enabling a sealing ring to be crushed between the outside surface of the free end of said spacer and the end face of said pipe-mounted flange by clamping the flange of the thrust member to a backing flange disposed against said opposite face of the pipe-mounted flange and including a spherical surface of said opposite face, at least one of said surfaces or faces having a spherical bearing surface;

said spherical bearing surfaces at each pipe end being disposed in such a manner as to have the same spherical center when the device is clamped; and the spacer of at least one of said thrust members being constituted by two spacers one of which comes into abutment against the end of the void in said thrust member and the other of which projects beyond the end of said central tube, with the facing ends of said two spacers having frustoconically-shaped surfaces whose faces face towards said central tube, a sealing ring being disposed between the facing ends of these two spacers in such a manner that said sealing ring is clamped between said ends and against the central tube when said thrust member is clamped to the corresponding backing flange.

2. A device according to claim 1, wherein each of the thrust 10 members includes two spacers separated by a sealing ring.

3. A device according to claim 2, wherein metal sealing rings are used.

4. A device according to claim 1, wherein metal sealing rings are used.

* * * * *